(12) United States Patent
Ginja et al.

(10) Patent No.: US 8,118,346 B2
(45) Date of Patent: Feb. 21, 2012

(54) SUPPORT MOUNT FOR AN IMPACT ABSORBING SYSTEM INTENDED TO BE MOUNTED AT THE END OF A MOTOR VEHICLE SIDE MEMBER

(75) Inventors: Stéphane Ginja, Amberieu en Bugey (FR); Sébastien Charnaux, Tossiat (FR); Hugues Cheron, Meximieux (FR)

(73) Assignee: Compagnie Plastic Omnium, Lyon (FR)

( * ) Notice: Subject to any disclaimer, the term of this patent is extended or adjusted under 35 U.S.C. 154(b) by 25 days.

(21) Appl. No.: 12/448,597

(22) PCT Filed: Dec. 21, 2007

(86) PCT No.: PCT/FR2007/052604
§ 371 (c)(1),
(2), (4) Date: Sep. 22, 2009

(87) PCT Pub. No.: WO2008/087346
PCT Pub. Date: Jul. 24, 2008

(65) Prior Publication Data
US 2010/0102577 A1    Apr. 29, 2010

(30) Foreign Application Priority Data
Dec. 28, 2006  (FR) ...................................... 06 56032

(51) Int. Cl.
*B60R 19/34* (2006.01)
(52) U.S. Cl. .............. 296/187.03; 296/187.09; 293/133; 293/142; 293/143; 293/155
(58) Field of Classification Search ............ 296/187.03, 296/187.09, 193.09, 203.02; 293/133, 155, 293/143, 144, 142; 180/68.4
See application file for complete search history.

(56) References Cited

U.S. PATENT DOCUMENTS

| | | | | |
|---|---|---|---|---|
| 6,398,275 B1* | 6/2002 | Hartel et al. | ................... | 293/102 |
| 6,450,276 B1* | 9/2002 | Latcau | .......... | 180/68.4 |
| 6,467,822 B1* | 10/2002 | Leng | .............. | 293/121 |
| 6,619,730 B2* | 9/2003 | Porner | ......................... | 296/204 |
| 6,663,150 B1* | 12/2003 | Evans | .......................... | 293/120 |
| 6,672,652 B2* | 1/2004 | Takeuchi et al. | ......... | 296/193.09 |
| 6,869,131 B2* | 3/2005 | Kafuku et al. | ........... | 296/187.09 |
| 6,923,495 B2* | 8/2005 | Kishikawa et al. | ....... | 296/193.09 |
| 7,066,509 B2* | 6/2006 | Kollaritsch et al. | ........... | 293/133 |
| 7,093,866 B2* | 8/2006 | Toneatti et al. | ............... | 293/133 |
| 7,210,719 B2* | 5/2007 | Honda et al. | .................. | 293/155 |
| 7,410,018 B2* | 8/2008 | Satou | ......................... | 180/68.4 |

(Continued)

FOREIGN PATENT DOCUMENTS
EP         1 036 715 A2      9/2000
(Continued)

*Primary Examiner* — Glenn Dayoan
*Assistant Examiner* — Gregory Blankenship
(74) *Attorney, Agent, or Firm* — Oliff & Berridge, PLC

(57) ABSTRACT

The supporting piece is intended to be mounted at the end of a motor vehicle side member, this side member including, in the continuation thereof, a plate for mounting a transverse impact beam. The supporting piece includes a bearing surface for an absorber positioned in front of this bearing surface, the bearing surface being arranged in such a way as to extend under the mounting plate and substantially parallel thereto when the supporting piece is mounted at the end of the side member. The supporting piece is shaped in such a way that it does not deform irreversibly when the vehicle suffers an insurance impact.

18 Claims, 4 Drawing Sheets

U.S. PATENT DOCUMENTS

| | | | |
|---|---|---|---|
| 7,517,006 B2 * | 4/2009 | Kageyama et al. | 296/187.09 |
| 7,681,700 B2 * | 3/2010 | Ginja et al. | 188/377 |
| 7,686,358 B2 * | 3/2010 | Takahashi et al. | 293/102 |
| 7,766,112 B2 * | 8/2010 | Kapadia et al. | 180/68.4 |
| 7,766,420 B2 * | 8/2010 | Maruyama et al. | 296/203.02 |
| 2002/0017804 A1 | 2/2002 | Kroning et al. | |
| 2002/0101085 A1 | 8/2002 | Gehringhoff et al. | |

FOREIGN PATENT DOCUMENTS

| | | |
|---|---|---|
| EP | 1 160 133 A2 | 12/2001 |
| EP | 1 266 818 A2 | 12/2002 |
| EP | 1 293 389 A1 | 3/2003 |
| EP | 1 419 936 A1 | 5/2004 |

* cited by examiner

SUPPORT MOUNT FOR AN IMPACT ABSORBING SYSTEM INTENDED TO BE MOUNTED AT THE END OF A MOTOR VEHICLE SIDE MEMBER

FIELD OF THE INVENTION

This invention relates to a supporting piece for an impact-absorbing system intended to be mounted at the end of a motor vehicle side member.

BACKGROUND OF THE INVENTION

In the remainder of the document, we will consider that the impact-absorbing system of a motor vehicle comprises vehicle parts capable of absorbing the energy during an impact, in particular during a high speed impact. The absorbing system may therefore comprise a transverse beam supported by the ends of the side members of the vehicle body in white via impact absorbers called "crash boxes". Note that in this case, the side members are part of the impact-absorbing system. It is reminded that the "body in white" of the vehicle is a structural assembly of this vehicle comprising a chassis, side members and the side vertical members of the vehicle doors.

In case of impact, the transverse beam may work in flexion, if the impact is between the two side members, or without flexion if the beam is too rigid or if the impact occurs at a side member. In all cases, the absorbers are stressed and deform, absorbing as much of the energy of the impact as possible to spare the side members and so that the vehicle can be repaired without repairs to the body in white. This type of traditional impact absorption structure, based on the side members of the body in white, is known as the "upper absorption structure".

This type of upper structure deals with head-on collisions at high speed (56 to 64 km/h) and insurance impacts. It is reminded that an "High speed" impact correspond to an impact of the vehicle against a rigid or deformable obstacle at a speed of 56 to 64 km/h, dealt with for the purpose of protecting occupants of the vehicle. Furthermore, "insurance impacts" are impacts at about 15 km/h against a rigid wall, such as so-called Danner impacts, or "AZT" impacts, or at about 8 km/h against a pole (IIHS standard pole impact). Such a shock is dealt with for the purpose of reducing the vehicle repair costs and in particular of protecting the body in white of the vehicle.

In addition to an upper absorption structure, some vehicles also have a "lower absorption structure", leaning on extensions of the engine cradle or on small side members substantially parallel to the side members of the upper absorption structure but located at the height of a pedestrian impact beam. An engine cradle comprising extensions is called "long cradle", as opposed to an engine cradle without extensions, known as "short cradle".

If a motor vehicle is equipped with a lower structure, it also has a second lower structure transverse beam and possibly an absorber supported by this second transverse beam. This lower structure can deal with both pedestrian impacts and insurance impacts. "Pedestrian impacts" on bumpers correspond to a shock of an impactor simulating the leg of a pedestrian striking the bumper at 40 km/h.

This type of lower structure distributes the energy to be absorbed in case of impact between this lower structure and the traditional upper structure through the side members. Especially in case of insurance impact, roughly ⅔ of the energy is absorbed by the upper structure and ⅓ by the lower structure.

Nevertheless, some vehicles do not have cradle extensions to form a lower structure in addition to the upper structure at the height of the side members. In this case, longer impact absorbers are generally required on the upper structure, in order to absorb sufficient energy in case of insurance impact. To accommodate these longer absorbers, the overhang in the longitudinal direction of the vehicle, in other words the length of the front part of this vehicle between the side members and the bumper skin, must be increased.

OBJECT AND SUMMARY OF THE INVENTION

The purpose of this invention is to deal with insurance impacts, even for vehicles with a short cradle, without increasing the vehicle overhang.

This invention relates to a supporting piece for an impact-absorbing system intended to be mounted at the end of a motor vehicle side member, this side member comprising, in its extension, a plate for mounting a transverse impact beam, characterised in that:
- the supporting piece comprises a bearing surface for an impact absorber positioned in front of this bearing surface, the bearing surface being arranged in such a way as to extend under the mounting plate and substantially parallel thereto when the supporting piece is mounted at the end of the side member,
- the supporting piece is shaped in such a way that it does not deform irreversibly when the vehicle suffers an insurance impact.

The supporting piece according to the invention therefore allows the motor vehicle to have a lower energy absorption area, capable of dealing with insurance impacts without, however, the need for cradle extensions or lower structure side members.

Since the supporting piece extends under the mounting plate, it increases the area for transmission of forces to the vehicle side members. It therefore transmits the forces to the upper absorption structure during an insurance impact, while offering a bearing surface for energy absorption by compressing the absorber placed in front of this supporting piece in lower area. Consequently, if the vehicle does not have cradle extensions or lower structure side members, it can absorb sufficient energy in case of insurance impact, without the need for longer impact absorbers on the upper structure.

The invention is especially advantageous for vehicles which have extremely strong side members, which may be the case further to standardisation of vehicle bodies in white (and therefore of side members). In this case, since the side members are stronger, in addition to their traditional function, they can transmit forces, a function usually performed by the cradle extensions.

Note that the supporting piece according to the invention is shaped in such a way that it does not deform irreversibly when the vehicle suffers an insurance impact, thereby making it different from a supporting piece intended to withstand only a pedestrian impact. For insurance impacts, in fact, the supporting piece remains intact for forces of up to 30,000 N.

In a particular embodiment of the invention, the supporting piece comprises, behind the extension, a tie which transmits onto a lower or lateral side of the side member, or possibly onto an additional part attached to the side member, the forces imposed during compression of the absorber. This tie, preferably a bracket, strengthens the supporting piece, increasing its resistance in case of bending or other deformation in case of insurance impact.

In a particular embodiment of the invention, the supporting piece is made from plastic or glass fibre reinforced plastic. At least one metal reinforcement part may be used in addition to this supporting piece to strengthen it and increase its resistance in case of insurance impact.

These metal reinforcement parts may be overmoulded or attached to the plastic part after manufacture.

Preferably, the supporting piece comprises means for attaching at least one motor vehicle functional unit, such as an absorber, an impact beam, a radiator, a horn, an electric box, a windscreen washer bottle or sealing components for the engine. These attachment means may also be fitted on the absorber positioned in front of the bearing surface.

The invention also relates to an impact-absorbing system for motor vehicle, comprising:
at least one side member comprising, in its extension, a plate for mounting a transverse impact beam, and
at least one supporting piece, mounted at the end of the side member, characterised in that the supporting piece is a supporting piece as defined previously.

An absorbing system according to the invention may also include one or more of the following characteristics.
The absorbing system comprises at least one lateral absorber, resting substantially over the entire height of the supporting piece.
The absorbing system comprises an upper transverse absorber, resting on the transverse impact beam, a lower transverse absorber resting on the bearing surface of the supporting piece and the lateral absorber(s) forming a rigid link between the upper and lower transverse absorbers. In case of insurance impact, such absorbers can undergo plastic deformation, resting on the supporting piece and on the impact beam which do not undergo plastic deformation.
The supporting piece is attached between the side member and the impact beam positioned opposite the side member.
The supporting piece is intended to cooperate with a lower absorption structure. In particular, the absorbing system comprises at least one engine cradle extension, the supporting piece being arranged in order to cooperate with the extension in case of impact to transmit to it at least some of the impact energy. Consequently, on vehicles with two absorption structures, the supporting piece transmits the impact energy to both the upper and lower structures.
The supporting piece is attached to a cradle extension.
The absorbing system comprises two supporting pieces, each attached to a respective side member of the vehicle, the two supporting pieces being connected together by at least one cross member, in particular a lower cross member, intended to deal with the pedestrian impact. The supporting pieces may also be connected by an upper cross member.

BRIEF DESCRIPTION OF THE DRAWINGS

It will be easier to understand the invention on reading the description below, given as an example and referring to the attached drawings, on which.

FIGS. 1 and 2 represent an impact-absorbing system for motor vehicle, designated by the general reference 10.

Figure 1:
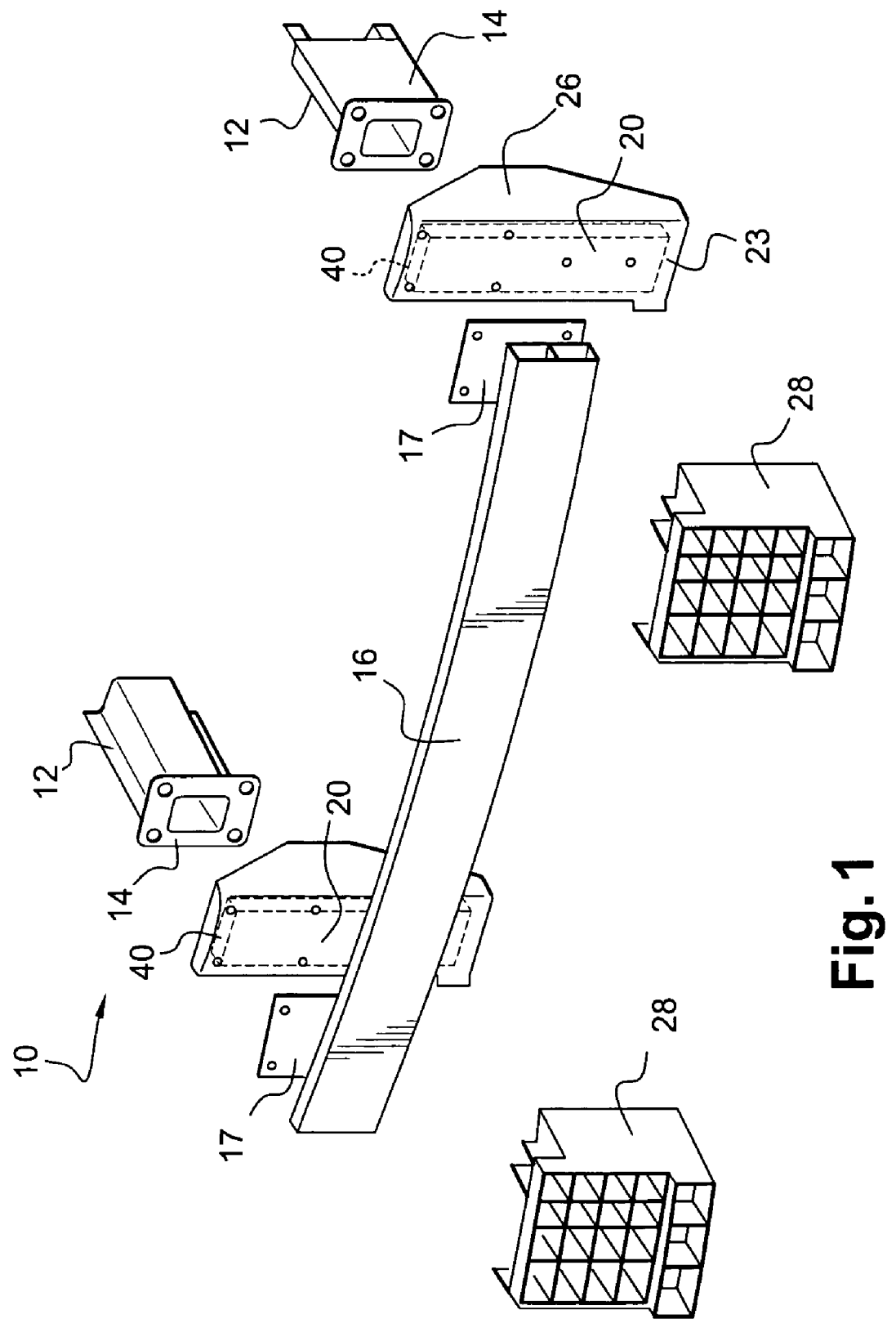
FIG. 1 is an exploded perspective view of a motor vehicle impact-absorbing system, comprising a supporting piece according to a first embodiment of the invention.

This absorbing system 10 is designed to be assembled on a motor vehicle, in front of a radiator (not shown) of the motor vehicle.

The motor vehicle comprises side members 12, each side member 12 comprising in its extension a plate 14 for mounting a transverse impact beam 16 of the absorbing system 10.

In case of insurance impact against the impact beam 16, the latter may deform by flexion so as to absorb some of the energy. The beam 16 also transfers forces to the side members 12.

Figure 2:
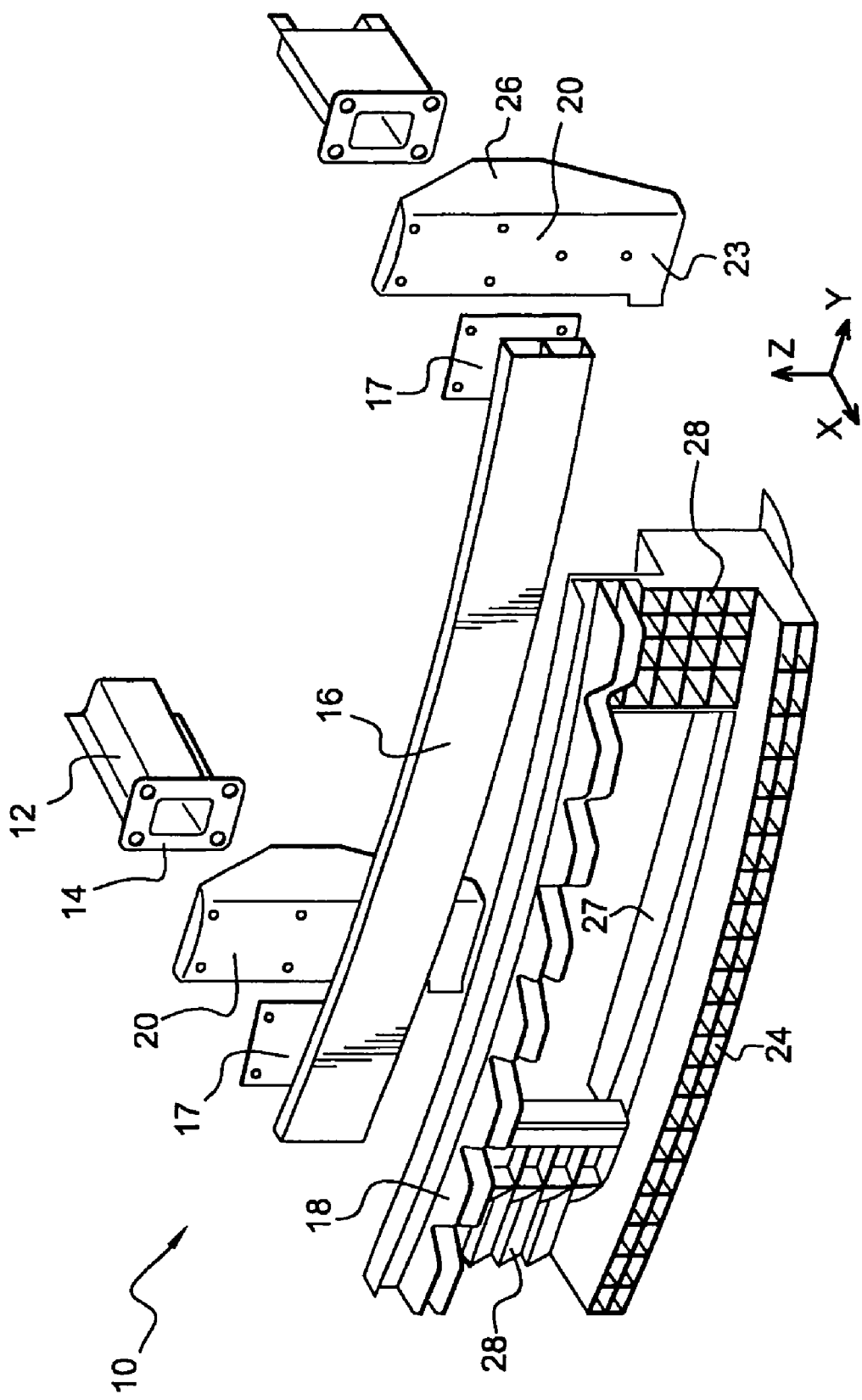
FIG. 2 is a view similar to FIG. 1 according to a second embodiment of the invention.

However, in order to absorb more of the energy of an impact, in addition to the crash boxes 17 provided between the beam 16 and the side members 12, the absorbing system comprises an upper transverse absorber 18, shown on FIG. 2, positioned at the height of the side members 12, resting against the impact beam 16. This upper transverse absorber 18 is designed to deform by compression against the impact beam 16 during an impact.

The upper transverse absorber 18, the impact beam 16 and the side members 12 form an upper absorption structure of the motor vehicle.

In the current state of the art, if the vehicle does not have a lower structure, all the forces due to the impact are transmitted to the upper structure. In this case, to absorb sufficient energy of the impact, a relatively deep upper transverse absorber 18 is required, which means that the front overhang of the vehicle in the longitudinal direction X will be relatively long.

Figure 3:
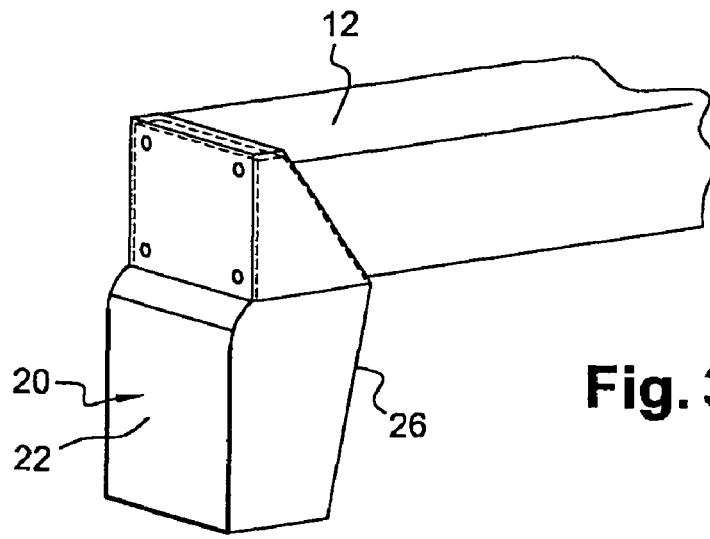
FIGS. 3 and 4 are views, respectively in perspective and in axial cross-section, of a supporting piece of the absorbing system shown on FIG. 1.
Figure 4:
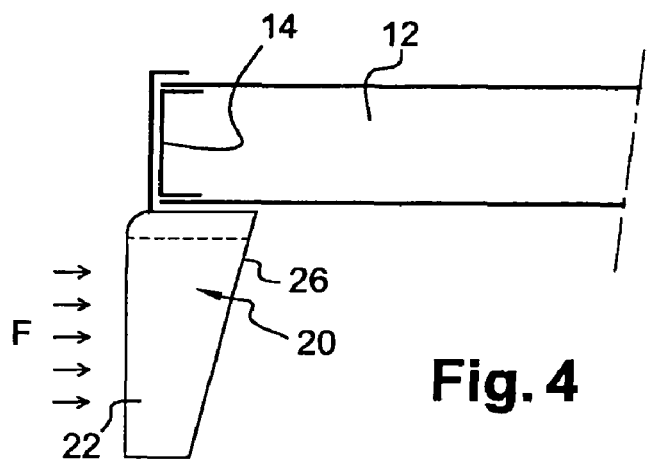

To overcome this disadvantage, the absorbing system 10 of the invention is equipped with supporting pieces 20 to absorb impacts, detailed on FIGS. 3 and 4. Each supporting piece 20 is mounted at the end of a respective side member 12, and attached between this side member 12 and the impact beam 16. Preferably, the supporting pieces 20 are made from plastic or glass fibre reinforced plastic.

Each supporting piece 20 comprises a bearing surface 22 for a lateral impact absorber, a lower impact absorption beam 28 positioned opposite this bearing surface 22. Each bearing surface 22 is arranged in such a way as to extend under the plate 14 of the corresponding side member 12 and substantially parallel to this plate 14.

In addition, each supporting piece 20 is shaped in such a way that it does not deform when the vehicle suffers an insurance impact.

Each supporting piece 20 therefore comprises reinforcement means, such as stiffening ribs or a metal stiffener 40, overmoulded or attached to the plastic supporting piece after manufacture. Those skilled in the art know how to shape stiffeners so that they can withstand a predetermined force, for example in this case, a force corresponding to an insurance impact.

Each supporting piece also comprises a tie 26 positioned behind the supporting piece 22, that can be attached to the side member 12 so as to transfer, to a lower or lateral side of this side member 12, the forces acting on the bearing surface 22.

Figure 5:
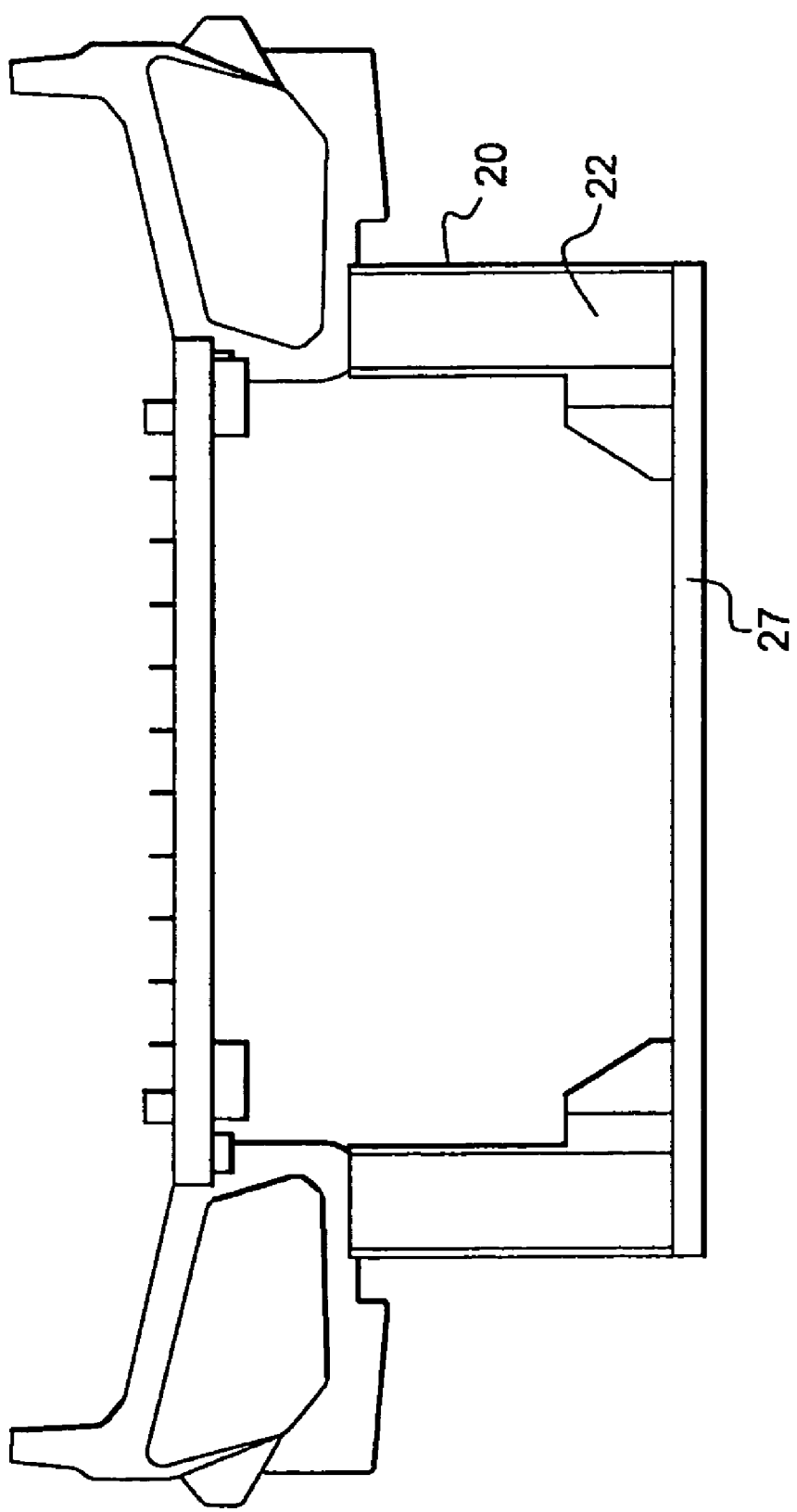
FIG. 5 is a front view of a part of the absorbing system shown on FIG. 1.

Preferably, the two supporting pieces 20 are connected together by a lower cross member 27 intended to deal with the pedestrian impact, as can be seen on FIG. 5. This lower cross member 27 forms a support for a lower transverse absorber 24, shown on FIG. 2, over the entire length of the cross member 27.

The lower transverse absorber 24, the lower cross member 27 and the lower part of the supporting piece 20 form a lower force absorption area, that can transfer the forces corresponding to the impacts to the side members 12. In case of impact therefore, the forces corresponding to the impact are distributed between the upper absorber 18, the lower absorber 24 and the lateral absorbers 28.

Consequently, unlike the current state of the art, the upper transverse absorber 18 does not form the main source of energy absorption and therefore does not have to be as deep as in the state of the art. The overhang of a vehicle comprising a system according to the invention is therefore reduced compared with that of a traditional vehicle of type without lower structure.

The lateral absorbers 28 provide a rigid link between the upper 18 and lower 24 transverse absorbers, thereby forming an "absorbing frame" resting on the supporting pieces 20, the impact beam 16 and the lower cross member 27. This absorbing frame may be fitted pre-equipped to the vehicle, thereby simplifying the vehicle assembly line.

In the embodiment shown on FIG. 2, the absorbing system of the vehicle comprises in particular the side members 12, the impact beam 16, the lower cross member 27, the supporting pieces 20 and the absorbing frame. During an insurance type impact, the absorbing frame is generally deformed irreversibly, unlike components 12, 16, 20 and 27 thereby reducing the repairs required.

According to a variant, the lower cross member 27 is mounted on the absorbing frame before mounting the resulting assembly on the vehicle.

Note that the vertical lateral absorbers 28 allow even greater distribution of the forces due to the impacts.

Each vertical absorber 28 generally rests substantially over the entire height of a corresponding supporting piece 20. The lower end of the supporting piece 20 also acts as support for the lower cross member 27.

Preferably, the supporting piece 20 comprises means for attaching at least one motor vehicle functional unit. For example, the functional unit may be a windscreen washer bottle, but as a variant it could be an absorber, an impact beam, a radiator, a horn, an electric box or sealing components for the engine. It would also be possible to attach functional units to the absorbers 18, 24 or 28, so that the absorbers do not have to be mounted on the vehicle assembly line.

Lastly, note that the invention is not limited to the embodiments described previously, but includes any variant using its main features with equivalent means.

Figure 6:
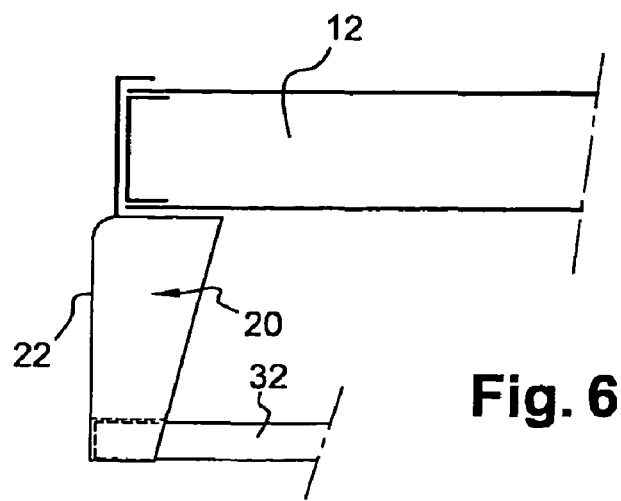
FIG. 6 is a view similar to that of FIG. 4 of a supporting piece according to an example of a variant of the embodiment.

In the variant shown on FIG. 6, the supporting pieces 20 could equally well be positioned on vehicles comprising engine cradle extensions 32 so that, in case of impact, some of the forces are transmitted to the vehicle side members 12 and the remaining forces to the extensions 32.

In this case, the supporting piece 20 is arranged so as to cooperate with the extension 32 to transmit to it some of the energy in case of impact. Preferably, the supporting piece 20 and the engine cradle extension 32 are attached together, as shown on FIG. 6, for example using attachment means arranged on the supporting piece 20.

The invention claimed is:

1. A supporting piece for an impact-absorbing system intended to be mounted at the end of a motor vehicle side member, the side member comprising, in its extension, a plate for mounting a transverse impact beam, the supporting piece comprising:
    a bearing surface for a lateral impact absorber positioned in front of the bearing surface and resting substantially over an entire height of the supporting piece, the bearing surface being arranged in such a way as to extend under the mounting plate and substantially parallel thereto when the supporting piece is mounted at the end of the side member, the lateral impact absorber forming a rigid link between an upper transverse absorber, resting on a transverse impact beam, and a lower transverse absorber, resting on the bearing surface of the supporting piece, and the supporting piece not bearing against cradle extensions
    wherein the supporting piece is shaped in such a way that it does not deform irreversibly when a vehicle on which the supporting piece is functionally mounted suffers an impact at about 15 kilometers per hour against a rigid wall.

2. The supporting piece according to claim 1, further comprising, behind the bearing surface, a tie that can be attached to the side member so as to transfer, to a lower or lateral side of the side member or to a connection piece attached thereto, forces imposed during compression of the lateral impact absorber.

3. The supporting piece according to claim 1, wherein the supporting piece is made from plastic or glass fiber reinforced plastic.

4. The supporting piece according to claim 3, further comprising at least one metal stiffener, overmoulded or attached to the plastic supporting piece after manufacture.

5. The supporting piece according to claim 1, further comprising a means for attaching at least one motor vehicle functional unit.

6. An impact-absorbing system for motor vehicle, comprising:
    at least one side member comprising, in its extension, a plate for mounting a transverse impact beam, and
    at least one supporting piece, mounted at the end of the side member, the supporting piece being a supporting piece according to claim 1.

7. The impact-absorbing system according to claim 6, wherein the supporting piece is attached between the side member and the impact beam, the impact beam being positioned opposite the side member.

8. The impact-absorbing system according to claim 6, further comprising two supporting pieces, each attached to a respective side member of the vehicle, the two supporting pieces being connected together by at least one cross member.

9. The impact-absorbing system according to claim 5, wherein the motor vehicle functional unit is one of: an absorber, an impact beam, a radiator, a horn, an electric box, a windscreen washer bottle, and sealing components for the engine.

10. A supporting piece for an impact-absorbing system intended to be mounted at the end of a motor vehicle side member, the side member comprising, in its extension, a plate for mounting a transverse impact beam, the supporting piece comprising:
    a bearing surface for a lateral impact absorber positioned in front of the bearing surface and resting substantially over an entire height of the supporting piece, the bearing surface being arranged in such a way as to extend under the mounting plate and substantially parallel thereto when the supporting piece is mounted at the end of the side member, the lateral impact absorber forming a rigid link between an upper transverse absorber, resting on a transverse impact beam, and a lower transverse absorber, resting on the bearing surface of the supporting piece, and the supporting piece not bearing against cradle extensions wherein the supporting piece is shaped in such a way that it does not deform irreversibly when a vehicle on which the supporting piece is functionally mounted suffers an impact at about 8 kilometers per hour against a pole.

11. The supporting piece according to claim 10, further comprising, behind the bearing surface, a tie that can be attached to the side member so as to transfer, to a lower or lateral side of the side member or to a connection piece attached thereto, forces imposed during compression of the lateral impact absorber.

12. The supporting piece according to claim 10, wherein the supporting piece is made from plastic or glass fiber reinforced plastic.

13. The supporting piece according to claim 12, further comprising at least one metal stiffener, overmoulded or attached to the plastic supporting piece after manufacture.

14. The supporting piece according to claim 10, further comprising a means for attaching at least one motor vehicle functional unit.

15. The impact-absorbing system according to claim 14, wherein the motor vehicle functional unit is one of: an absorber, an impact beam, a radiator, a horn, an electric box, a windscreen washer bottle, and sealing components for the engine.

16. An impact-absorbing system for motor vehicle, comprising:
at least one side member comprising, in its extension, a plate for mounting a transverse impact beam, and
at least one supporting piece, mounted at the end of the side member, the supporting piece being a supporting piece according to claim 10.

17. The impact-absorbing system according to claim 16, wherein the supporting piece is attached between the side member and the impact beam, the impact beam being positioned opposite the side member.

18. The impact-absorbing system according to claim 16, further comprising two supporting pieces, each attached to a respective side member of the vehicle, the two supporting pieces being connected together by at least one cross member.

* * * * *